United States Patent

Umeda et al.

[11] Patent Number: 6,020,669
[45] Date of Patent: Feb. 1, 2000

[54] COMPACT HIGH-POWER ALTERNATOR FOR A VEHICLE HAVING A ROTOR AND A STATOR

[75] Inventors: Atsushi Umeda, Okazaki; Tsutomu Shiga, Aichi-ken; Shin Kusase, Oobu, all of Japan

[73] Assignee: Denso Corporation, Kariya, Japan

[21] Appl. No.: 09/160,550

[22] Filed: Sep. 25, 1998

[30] Foreign Application Priority Data

Sep. 26, 1997 [JP] Japan .................................. 9-262229
Dec. 22, 1997 [JP] Japan .................................. 9-353471
Dec. 22, 1997 [JP] Japan .................................. 9-353472

[51] Int. Cl.$^7$ ................................ H02K 1/22; H02K 1/24
[52] U.S. Cl. ........................................ 310/263; 310/263
[58] Field of Search ........................................... 310/263

[56] References Cited

U.S. PATENT DOCUMENTS

| | | | |
|---|---|---|---|
| 4,228,377 | 10/1980 | Kreuzer ................................... | 310/263 |
| 5,132,581 | 7/1992 | Kusase ..................................... | 310/263 |
| 5,233,255 | 8/1993 | Kusumoto et al. . | |
| 5,519,277 | 5/1996 | York et al. ............................... | 310/263 |
| 5,536,987 | 7/1996 | Hayashi et al. .......................... | 310/263 |
| 5,543,676 | 8/1996 | York et al. ............................... | 310/263 |

FOREIGN PATENT DOCUMENTS

| | | |
|---|---|---|
| 0748028 | 12/1996 | European Pat. Off. . |
| 0762617 | 3/1997 | European Pat. Off. . |
| 0772279 | 5/1997 | European Pat. Off. . |
| 61-85045 | 4/1986 | Japan . |
| 5-161769 | 2/1993 | Japan . |

OTHER PUBLICATIONS

Susumu, "AC Power Generator for Vehicle", Patent Abstracts of Japan, Aug. 12, 1994.

*Primary Examiner*—Clayton LaBalle
*Assistant Examiner*—Karl E. Tamai
*Attorney, Agent, or Firm*—Pillsbury Madison & Sutro LLP

[57] ABSTRACT

It is an object of this invention to provide a compact high-power alternator for a vehicle. An alternator for a vehicle includes a stator serving as an armature, and a rotor serving to generate a magnetic field. The rotor includes a pole core having a cylindrical portion, a yoke portion, and a claw-like magnetic pole portion. The stator includes a stator iron core, an armature coil, and an insulator. A ratio $L1/L2$ of an axial-direction length $L1$ of the stator iron core to an axial-direction length $L2$ of the pole core is in a range of 0.7 to 1.0.

2 Claims, 8 Drawing Sheets

S1=S2>S3
0.7×L2<L1<L2
1.25×L3<L1<1.75×L3

S1=S2=S3
L1=L3

COMPACT HIGH-POWER ALTERNATOR FOR A VEHICLE HAVING A ROTOR AND A STATOR

BACKGROUND OF THE INVENTION

1. Field of the Invention

This invention relates to an alternator for a vehicle such as a passenger automotive vehicle or a truck.

2. Description of the Related Art

To reduce the aerodynamic resistance while traveling, a vehicle body tends to have a slanted nose shape. Securing a sufficient residential space for a passenger compartment is earnestly demanded. To satisfy these requirements, engine rooms of automotive vehicles have recently been becoming so narrow and crowded that only a limited space is available for installing an alternator. Meanwhile, to improve fuel economy, the rotational engine speed tends to be reduced during an idling condition. The rotational speed of the alternator decreases in accordance with the reduction of the rotational engine speed. On the other hand, there is a need for meeting the increasing electric loads caused by safety control devices or others. Thus, an alternator which generates a lot of power is strongly required. In other words, a compact high-power alternator for a vehicle is required. Also, an inexpensive alternator for a vehicle is desired.

It is also socially desirably to reduce the noise leaking from automotive vehicles into exteriors thereof. In general, the passenger compartments of automotive vehicles have been made quieter to increase the values of the vehicles. Accordingly, vehicular engine noise has been reduced. Magnetic noise generated by a vehicular alternator is more easily sensed as vehicular engine noise is reduced. Thus, a low-magnetic-noise inexpensive alternator for a vehicle is desired. Also, a compact high-power alternator for a vehicle is required.

In a general alternator (a prior-art alternator) for a vehicle, as shown in FIG. 12, a rotor contains a Lundel-type iron core (referred to as the pole core hereinafter) having a cylindrical portion, a yoke portion, and a claw-like magnetic pole portion. The entire length of the general alternator is determined by the axial-direction length (referred to as the axial length hereinafter) of the rotor. Accordingly, a reduction in the axial length of the rotor is desired for a compact alternator design.

In the rotor of the general alternator, as shown in FIG. 12, magnetic flux $\Phi$ flows from the cylindrical portion to the yoke portion and the claw-like magnetic pole portion, gradually advancing from the claw-like magnetic pole portion to a stator iron core. The magnetic flux $\Phi$ generated from the rotor is given as follows.

$$\Phi = Mf/G$$

where "Mf" denotes a magnetomotive force, and "G" denotes the sum of the magnetic resistances of respective portions. The magnetomotive force Mf is equal to the product of a current flowing in a field coil and the number of turns of the field coil. The magnetomotive force Mf is proportional to the product of the cross-sectional area of the field coil and the temperature of the field coil. Each of the magnetic resistances is proportional to the length of a magnetic path which is divided by the cross-sectional area of the magnetic path.

In the prior-art structure of FIG. 12, the magnetic-path cross-sectional areas S1, S2, and S3 at different portions of the pole core are set substantially equal to each other to prevent the occurrence of local magnetic saturation. The dimensions of the portions of the pole core are chosen to provide a proper space for the field coil which can generate a desired magnetomotive force. The cross-sectional area of a magnetic path in the stator iron core is made substantially uniform in correspondence with the magnetic flux generated by the rotor. The cross-sectional area of each slot in the stator iron core is decided on the basis of the resistance of a winding. As a result, the axial length of the stator is also determined.

In a prior-art magnetic circuit which is designed in such a way, the axial length L3 of the cylindrical portion of the pole core is substantially or approximately equal to the axial length L1 of the stator iron core as shown in FIG. 12.

In the prior-art structure of FIG. 12, when an increased alternator power output is required, the magnetic flux $\Phi$ generated by the rotor is increased. To implement the generation of increased magnetic flux, it is necessary to increase the magnetomotive force Mf or to reduce the magnetic resistances.

In the prior-art structure of FIG. 12, to increase the magnetomotive force Mf, it is necessary to increase the cross-sectional area occupied by the field coil or to enhance the cooling performance of the field coil. If the cross-sectional area occupied by the field coil is increased without changing the size of the alternator, the cross-sectional areas of other magnetic paths need to be uniformly reduced. The reductions in the cross-sectional areas of the magnetic paths result in increases in the magnetic resistances. The increased magnetic resistances cause a reduction in the generated magnetic flux $\Phi$. If a greater cross-sectional area of the magnetic path is required to reduce the magnetic resistance, it is necessary to reduce the cross-sectional area occupied by the field coil. Thus, the prior-art structure of FIG. 12 needs to be designed in consideration for a trade-off between the two requirements.

Japanese published unexamined utility-model application 5-11769 (corresponding to U.S. Pat. No. 5,233,255) discloses a general structure having built-in-type cooling fans which are fixed to two magnetic pole side surfaces of a rotor for cooling a field coil. In the general structure of Japanese application 5-11769, the rotor has an approximately flat shape such that at a rotor cross-section, the width of two side surfaces of the pole core is smaller than the radial-direction height. Thus, the area of contact between the field coil and the pole core is increased to enhance the thermal conductivity. As a matter of fact, it is difficult to improve the cooling performance for the following reason. Bridge portions (referred to as the coil ends hereinafter) of an armature coil which are located at two axial-direction side surfaces of a stator iron core are opposed and adjacent to base portions of magnetic pole claws of a pole core in a radially inner side thereof. Since an alternating current flows through the armature coil, alternating magnetic flux occurs therearound. The magnetic flux flows into the base portions of the magnetic pole claws of the pole core. The pole core is made of iron. Thus, an eddy current occurs therein, and heating takes place. Among parts of the alternator, the armature coil is a heating source having the highest temperature. Heat is radiated from the coil ends of the armature coil to the base portions of the magnetic pole claws of the pole core. Therefore, the cooling performance of the pole core is decreased, and the conduction and the radiation of heat from the field coil to the pole core are impaired. Thus, it is difficult to lower the temperature of the field coil.

In a prior-art designing method, if the magnetic-path cross-sectional area of one portion of a rotor or a stator is increased while the magnetic-path cross-sectional areas of other portions remain unchanged, the magnetic flux Φ generated by the rotor is hardly increased since magnetic saturation of a portion with a high magnetic flux density restricts the whole magnetic flux. Thus, an alternator power output per alternator weight is hardly improved. Enlarging the magnetic-path cross-sectional areas of all portions is contrary to the miniaturization of the alternator.

The claw-like magnetic pole portions of the pole core have a natural frequency with respect to swinging vibration in radial directions. When a magnetic force acting between the stator iron core and the rotor pole core is tuned to the natural frequency, sound from the claws (i.e., claw noise) occurs.

In a general prior-art alternator having a 12-pole rotor core and a stator iron core with 36-magnetic-pole teeth, as shown in FIG. 13, claw sound with a high level occurs at an alternator rotational speed of 11,000 rpm. Such high-level claw noise is annoying.

SUMMARY OF THE INVENTION

It is an object of this invention to provide a compact, high-power, low-magnetic-noise, and inexpensive alternator for a vehicle by designing a magnetic circuit so that the cooling performance of a field coil is enhanced and the magnetomotive force is increased without increasing the alternator size, and the magnetic flux generated by the field coil effectively flows into a stator iron core.

To attain the above-mentioned object, an alternator for a vehicle according to this invention is designed as follows. Coil ends of a stator and base portions of claw-like magnetic pole portions of a pole core are separated from each other, and thereby an eddy current loss is suppressed and the affection of heat radiated from the coil ends is reduced. Therefore, the cooling performance of a field coil is enhanced, and the magnetomotive force is increased. In addition, a prior-art designing method is modified in which magnetic-path cross sections of the claw-like magnetic pole portions of the pole core are uniform. The alternator of this invention is compact, and generates a high power.

The present invention is directed to an alternator for a vehicle which includes a field rotor and a stator. The field rotor includes a Lundel-type iron core and a field coil provided on the Lundel-type iron core. The Lundel-type iron core has a cylindrical portion, a yoke portion, and a claw-like magnetic pole portion. The field coil is provided on the cylindrical portion. The yoke portion extends from the cylindrical portion in a radially outward direction. The claw-like magnetic pole portion is connected to the yoke portion, and is formed so as to surround the field coil. The stator is located radially outward of the claw-like magnetic pole portion, and is opposed to the claw-like magnetic pole portion. The stator includes a multiple-layer iron core and an armature coil provided on the multiple-layer iron core. A ratio L1/L2 of an axial-direction length L1 of the multiple-layer iron core of the stator to an axial-direction length L2 of the Lundel-type iron core is in a range of 0.7 to 1.0.

In the present invention of claim 1, coil ends of the stator and a base portion of the claw-like magnetic pole portion of the pole core are separated from each other, and thereby alternating magnetic flux generated from the coil ends is prevented from passing through the pole core and hence an eddy current loss is suppressed. In addition, the effect of heat radiated from the coil ends is reduced. Therefore, the temperature of the pole core drops, and the heat transfer from the field coil to the pole core is enhanced. Thus, the field coil is cooled, and the magnetomotive force is increased. Accordingly, it is possible to provide a compact, highly-efficient, and high-power alternator.

According to another aspect of the invention, the above described alternator for the vehicle is designed so that a ratio L1/L3 of the axial-direction length L1 of the multiple-layer iron core of the stator to an axial-direction length L3 of the cylindrical portion of the Lundel-type iron core is in a range of 1.25 to 1.75, and a ratio R2/R1 of an outside radius R2 of the cylindrical portion of the Lundel-type iron core to an outside radius R1 of the claw-like magnetic pole portion of the Lundel-type iron core is in a range of 0.54 to 0.60. Therefore, as shown in FIG. 1, the yoke portion of a pole core can be opposed to the stator iron core, and magnetic flux can directly flow from the yoke portion into the stator iron core. Thus, the magnetic flux which comes from the claw-like magnetic pole portion can be reduced, and the cross-sectional area of the claw-like magnetic pole portion can be reduced in proportion thereto. Accordingly, a usable space in the pole core is provided with a surplus so that the outside radius R2 of the cylindrical portion of the Lundel-type iron core can be greater than that in a prior-art design while a sufficient cross-sectional area of the field coil is maintained. Specifically, the ratio R2/R1 of the outside radius R2 of the cylindrical portion of the Lundel-type iron core to the outside radius R1 of the claw-like magnetic pole portion of the Lundel-type iron core is set in the range of 0.54 to 0.60. Thereby, it is possible to provide a magnetic-path cross-sectional area greater than that in a prior-art design. Thus, the magnetic resistances can be reduced, and the magnetic flux Φ generated by the rotor can be increased. Since an increase in the volume of the pole core causes an increase in the thermal capacity thereof, the temperature of the field coil can be further dropped. Therefore, it is possible to provide a compact, highly-efficient, and high-power alternator.

According to the another aspect of the present invention, the alternator for the vehicle which is mentioned above is designed so that a resin impregnated sheet surrounds the field coil, and the field coil is in engagement with an inner circumferential surface of the claw-like magnetic pole portion via the resin impregnated sheet. Thereby, the space in the pole core for the field coil can be efficiently used, and a higher power output of the alternator is enabled by increasing the magnetomotive force. The heat transfer (the heat conduction) from the field coil to the side surface of the yoke portion of the pole core and the inner circumferential surface of the claw-like magnetic pole portion of the pole core is enhanced, and hence the power output of the alternator can be further increased.

According to the another aspect of the claimed invention, the alternator for the vehicle which is mentioned above is designed so that a resin impregnated sheet surrounds the field coil, and the field coil is in engagement with an inner circumferential surface of the claw-like magnetic pole portion via the resin impregnated sheet. Thus, the space in the pole core for the field coil can be efficiently used, and a higher power output of the alternator is enabled by increasing the magnetomotive force. The heat transfer (the heat conduction) from the field coil to the side surface of the yoke portion of the pole core and the inner circumferential surface of the claw-like magnetic pole portion of the pole core is enhanced, and hence the power output of the alternator can be further increased.

DESCRIPTION OF THE PREFERRED EMBODIMENTS

First Embodiment

Figure 1:
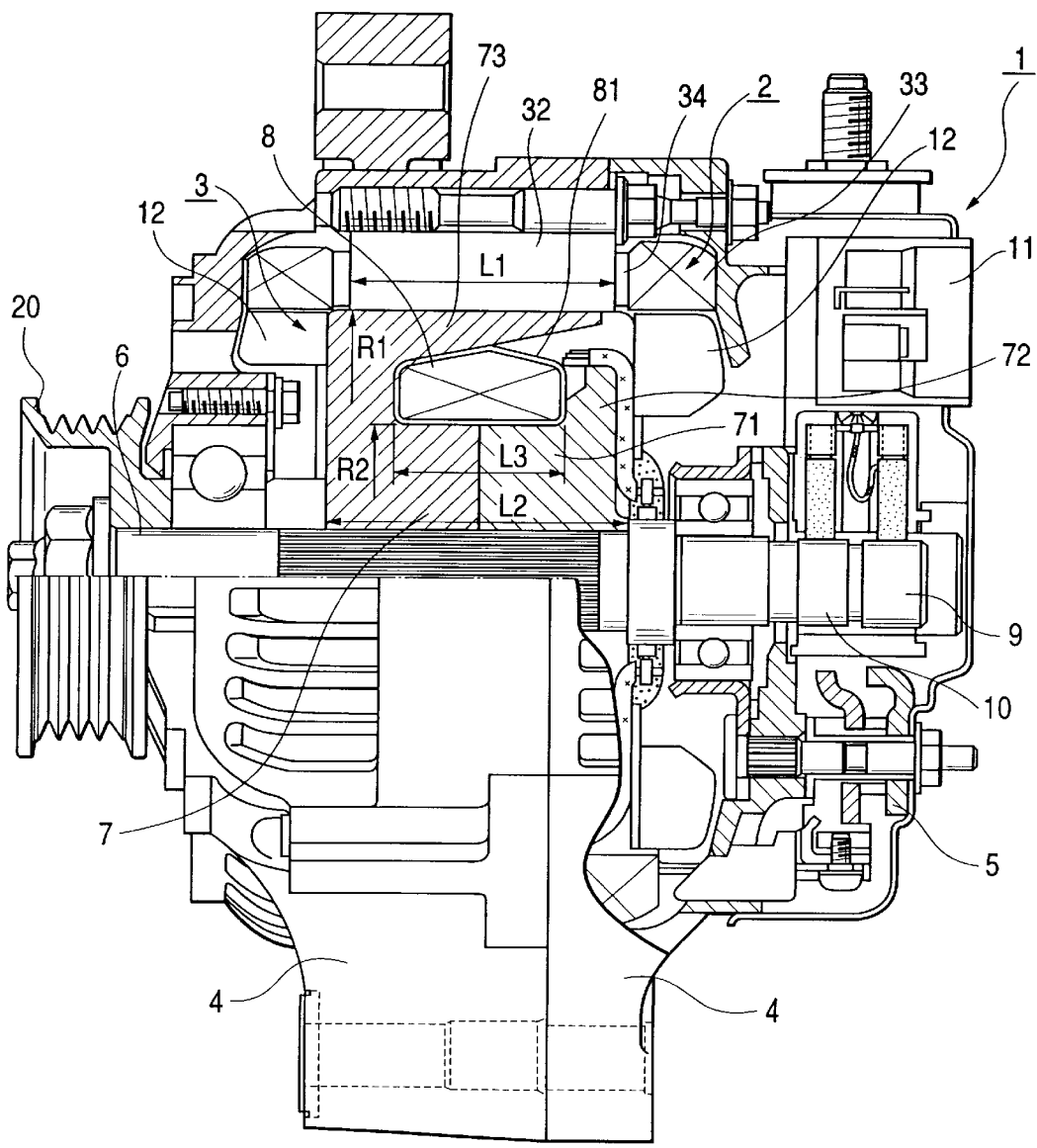
FIG. 1 is a sectional view of a main portion of an alternator for a vehicle according to an embodiment of this invention.

With reference to FIG. 1, an alternator 1 for a vehicle according to a first embodiment of this invention includes a stator 2, a rotor 3, a housing 4, a rectifier 5, and a voltage adjustment device 11. The stator 2 serves as an armature. The rotor 3 serves to generate magnetic field. The housing 4 supports the stator 2 and the rotor 3. The rectifier 5 is directly connected to the stator 2. The rectifier 5 converts alternating current power into direct current power. The voltage adjustment device 11 adjusts a field current to control a generated electric power.

The rotor 3 rotates together with a shaft 6. The rotor 3 includes one set of pole cores 7, cooling fans 12, a field coil 8, and slip rings 9 and 10. The pole cores 7 are of a Lundel-type. The shaft 6 is connected to a pulley 20, and is rotated and driven by an engine (not shown) for powering the vehicle.

Figure 2:
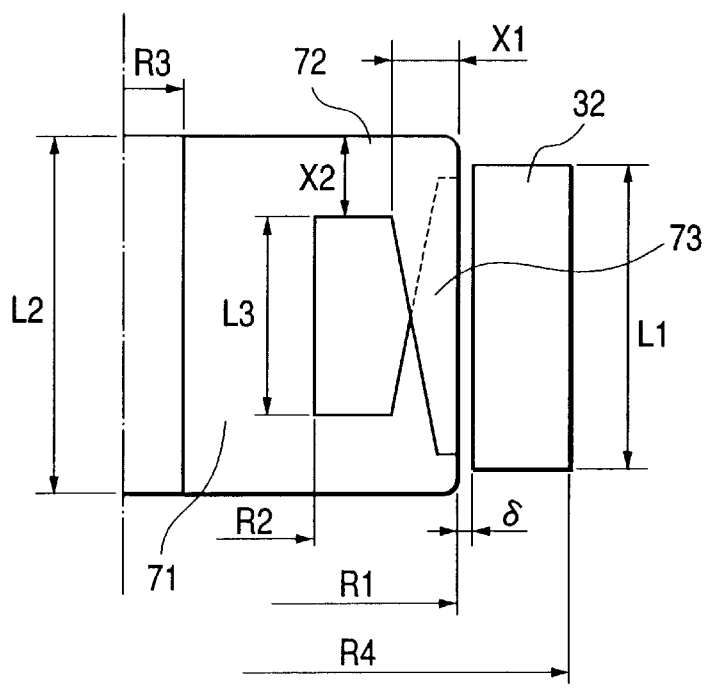
FIG. 2 is a diagram of a rotor and a stator in the alternator for the vehicle according to the embodiment of this invention.
Figure 3:
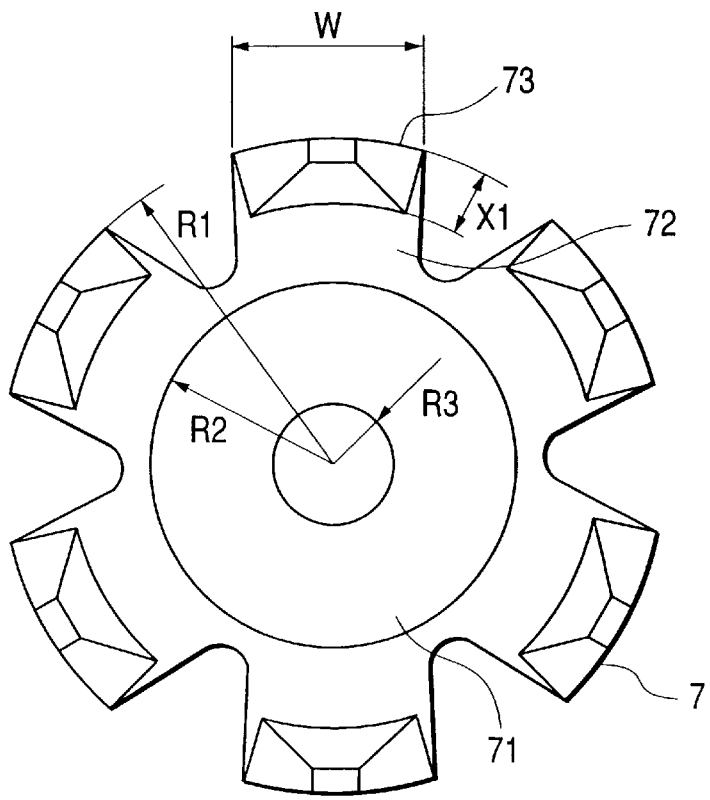
FIG. 3 is a diagrammatic view, in the direction from a cylindrical portion, of the rotor in the alternator for the vehicle according to the embodiment of this invention.

As shown in FIGS. 1, 2, and 3, each of the pole cores 7 of the rotor 3 has a cylindrical portion 71, a yoke portion 72, and a claw-like magnetic pole portion 73. The field coil 8 has a mountain-like shape such that a central portion of the field coil 8 as viewed in an axial direction is great in outside radius, and that the outside radius of a portion of the field coil 8 decreases as the portion is closer to an end. The contours of the field coil 8 correspond to shapes of the claw-like magnetic pole portions 73. The field coil 8 is in engagement with inner surfaces of the claw-like magnetic pole portions 73 via insulating paper 81 under a suitable compression force. The insulating paper 81 uses a resin impregnated sheet, and surrounds the field coil 8. The insulating paper 81 firmly holds the field coil 8 as a result of the exposure to a heating process. For example, a belt-like sheet is spirally wrapped around the field coil 8 to complete an enclosure. The field coil 8 may be sandwiched between petal-like sheets forming an enclosure.

The stator 2 has an iron core 32, an armature coil 33, and an insulator 34. The stator iron core 32 uses a multi-layer iron core. The armature coil 33 is provided on the stator iron core 32. The insulator 34 provides electric insulation between the stator iron core 32 and the armature coil 33. As previously indicated, the stator 2 is supported by the housing 4. The stator iron core 32 has a laminate of thin steel plates. Thus, the stator iron core 32 is of the multiple-layer type. Coil ends of the armature coil 33, that is, bridge portions of the armature coil 33, are located at two axial-direction sides of the stator iron core 32.

A magnetic circuit will be explained in detail with reference to FIGS. 2 and 3. The axial length L2 of the pole cores 7 is equal to the axial length L3 of the cylindrical portions 71 plus twice the axial-direction thickness X2 of the yoke portions 72. The ratio L1/L2 of the axial length L1 of the stator iron core 32 to the axial length L2 of the pole cores 7 is set in the range of 0.7 to 1.0. The ratio L1/L3 of the axial length L1 of the stator iron core 32 to the axial length L3 of the cylindrical portions 71 of the pole cores 7 is set in the range of 1.25 to 1.75. The outside radius of the cylindrical portions 71 is denoted by R2. The outside radius of the claw-like magnetic pole portions 73 is denoted by R1. The ratio R2/R1 of the outside radius R2 to the outside radius R1 is set in the range of 0.54 to 0.60.

A reference cross-sectional area (a basic cross-sectional area) S1 is defined as follows.

$$S1=\{\pi/(4P)\}(R2^2-R3^2)$$

where "P" denotes the number of magnetic poles in the pole cores 7, and "R3" denotes the radius of the shaft 6.

The magnetic pole width W of the claw-like magnetic pole portions 73 is set as follows.

$$W=\pi R1/(2P)$$

The cross-sectional area S2 of the yoke portions 72 is set as follows.

$$S2=S1=W \cdot X2$$

This relation determines the axial-direction thickness X2 of the yoke portions 71.

The coil radius and other dimensions of the field coil 8 are chosen to satisfy the following conditions. A usable space defined by the inner surfaces of the cylindrical portions 71, the yoke portions 72, and the claw-like magnetic pole portions 73 is occupied by the field coil 8 at an occupancy of 68%. The field coil 8 has a resistance of 2.3 Ω.

The outside radius R4 of the stator 2 is set equal to 129% of the outside radius R1 of the claw-like magnetic pole portions 73 of the pole cores 7. The dimensions of the portions of the stator iron core 32 are chosen so that the cross-sectional area will have a ratio of 66% with respect to the reference cross-sectional area S1. A ratio of 66% is generally used as a result of a consideration of the leak of magnetic flux.

An air gap δ in the alternator 1 (an air gap between the stator 2 and the rotor 3) is set to a generally used value, that is, 0.35 mm. The outside radius R1 of the claw-like magnetic pole portions 73 is set to 92 mm. The thickness of distal ends of the claw-like magnetic pole portions 73 and other dimensions are chosen to correspond to a ratio similar to the ratio in a prior-art vehicular alternator.

Figure 9:
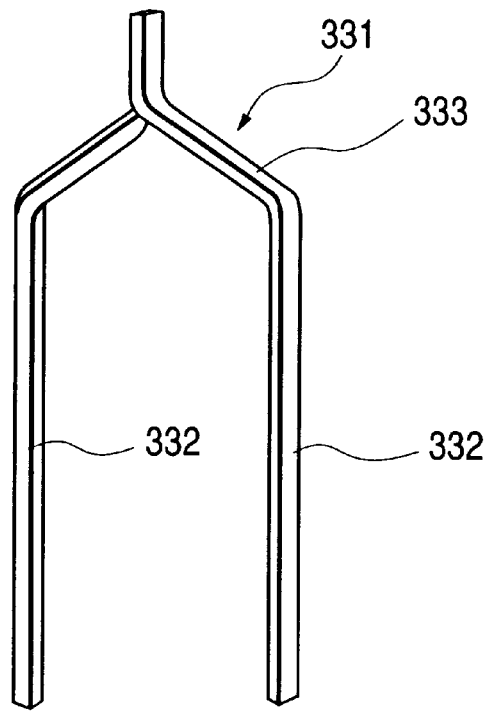
FIG. 9 is a perspective view of a U-shaped armature coil segment in the embodiment of this invention.
Figure 10:
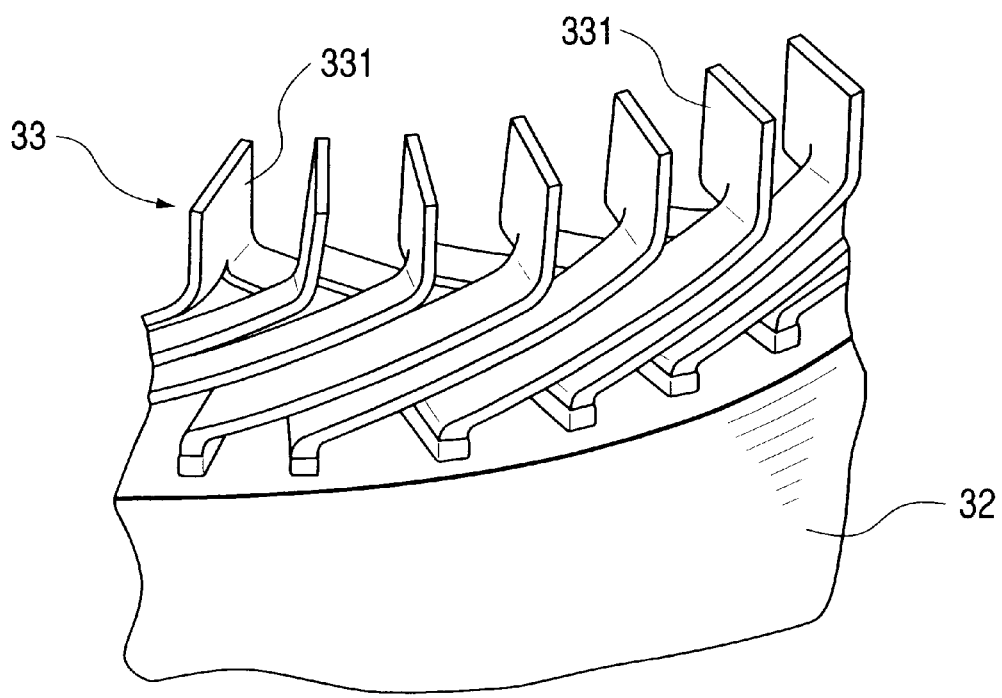
FIG. 10 is a perspective view of armature coil ends on the stator in the embodiment of this invention.

The armature coil 33 is formed by U-shaped electric conductors 331 each having two straight portions 332, and a turn portion (a bridge portion) 333 connecting ends of the straight portions 332 as shown in FIG. 9. With reference to FIG. 10, the U-shaped electric conductors 331 are inserted into slots in the stator iron core 32 in a manner such that ones of the straight portions 332 of the U-shaped electric conductors 331 are placed in inner radial regions of the slots (that is, opening sides of the slots in the radial directions) to form inner layers while the others are placed in outer radial regions of the slots (that is, deep regions of the slots) to form outer layers. In addition, the turn portions 333 of the U-shaped electric conductors 331 which connect the ends of the straight portions 332 thereof form coil ends (bridge portions) extending out of the slots. During the formation of the armature coil 33 on the stator iron core 32, the U-shaped electric conductors 331 are made in a stack, being inserted into the slots via ends of the slots in one side so that the coil ends will be aligned. The inner-layer and outer-layer straight line portions 332 of the U-shaped electric conductors 331 which project from ends of the slots in the other side are bent toward circumferential directions of the stator iron core 32. Then, each of the straight line portions 332 extending out of the slots is connected to another of the straight line portions 332 which is separate from the former straight line portion 332 by one pole, and which is in a layer different from the layer of the former straight line portion 332. The electric conductors 331 in the outer layers and the inner layers in different slots are connected in series to complete the armature coil 33.

An explanation will be given of the advantages provided by the first embodiment of this invention. As previously indicated, the ratio L1/L2 of the axial length L1 of the stator iron core 32 to the axial length L2 of the pole cores 7 is set in the range of 0.7 to 1.0. Therefore, the coil ends (the bridge portions) of the armature coil 33 can be separated from base portions of the claw-like magnetic pole portions 73 of the pole cores 7. Thus, alternating magnetic flux generated from the coil ends is prevented from passing through the pole cores 7 and hence an eddy current loss is suppressed. In addition, the affect of heat radiated from the coil ends on the pole cores 7 is reduced. Therefore, the temperature of the pole cores 7 is relatively low, and the heat transfer (the heat conduction) from the field coil 8 to the pole cores 7 is enhanced. Thus, the field coil 8 can be efficiently cooled.

Figure 4:
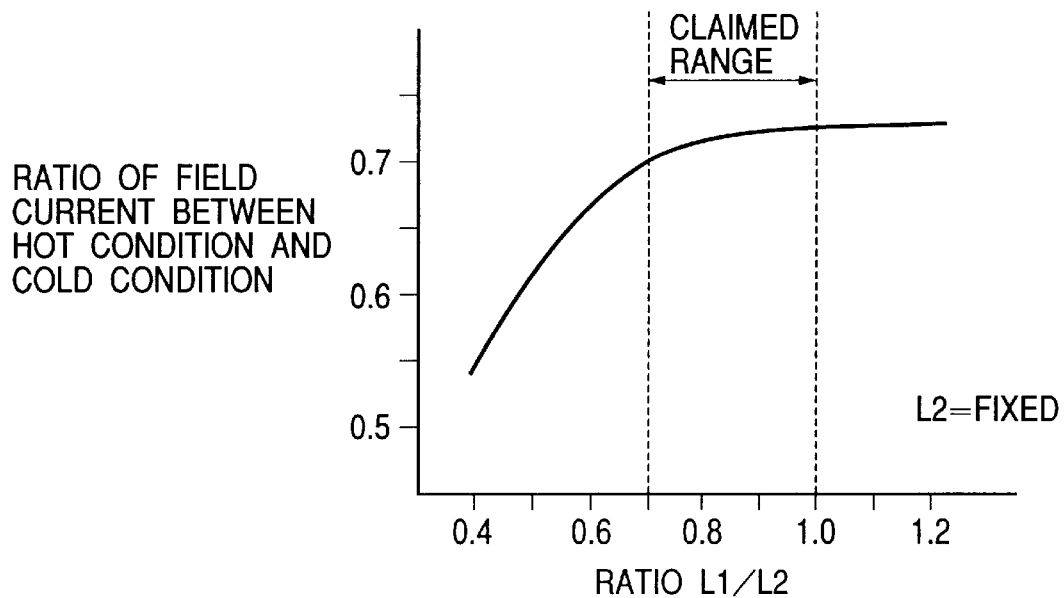
FIG. 4 is a diagram of the relation between a ratio L1/L2 and a ratio of a field current between a hot condition and a cold condition.

The advantages of the first embodiment of this invention were confirmed by experiments. FIG. 4 shows the results of experiments during which the ratio in a field current between a cold condition and a hot condition was measured while the ratio L1/L2 was varied as a parameter. As the cooling performance of the field coil 8 is better, a field current reduction in the hot condition decreases. Thus, in FIG. 4, a greater ratio in the field current between the cold condition and the hot condition means a better cooling performance of the field coil 8. It was found from FIG. 4 that when the ratio L1/L2 was equal to or greater than 0.7, the ratio in the field current between the cold condition and the hot condition saturated so that an eddy current loss hardly occurred and the negative effect of radiated heat hardly took place.

Figure 5:
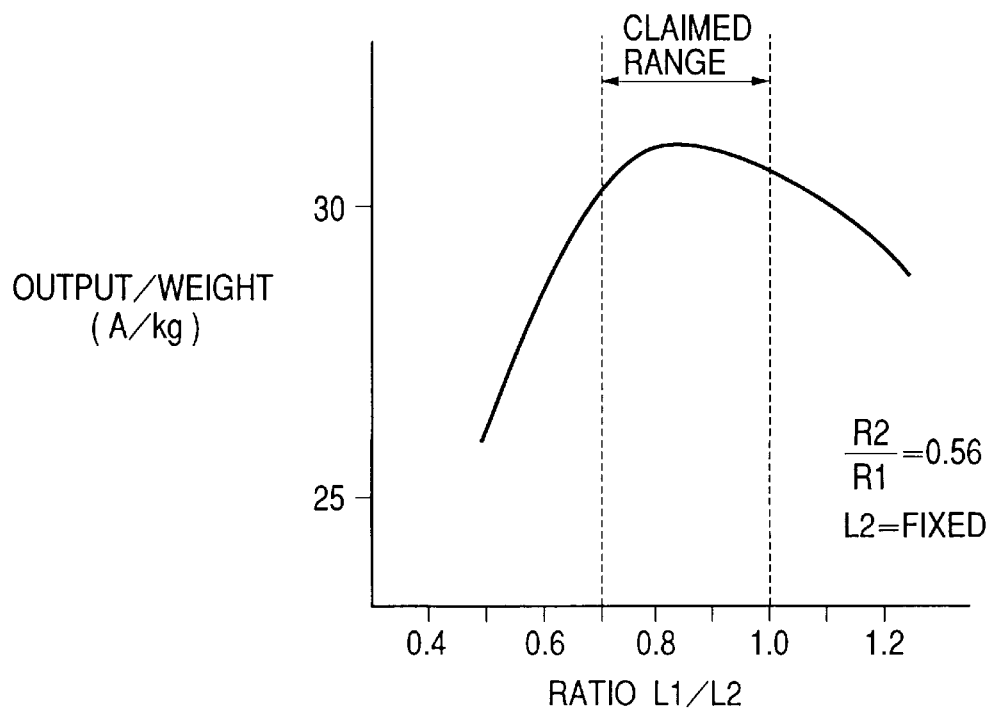
FIG. 5 is a diagram of the relation between an alternator power output per unit weight and a ratio L1/L2.

FIG. 5 shows the results of experiments during which an alternator power output per unit weight was measured while the ratio L1/L2 was varied as a parameter. During the experiments, the ratio R2/R1 was fixed to 0.56, and the length L2 was fixed to a given value. In addition, during the experiments, the maximum alternator power output was measured when the alternator was operated at a rotational speed of 2,000 rpm and an alternator voltage of 13.5V, and under the presence of thermal saturation. The alternator power output per unit weight in FIG. 5 was equal to the maximum alternator power output divided by the sum of the weights of the rotor 3 and the stator 2. It was found from FIG. 5 that the alternator power output per unit weight rose as the ratio L1/L2 was increased toward a value of 0.8 (that is, the axial length L1 of the stator iron core 32 was increased). The rise in the alternator power output per unit weight was caused by an increase in the magnetic-path cross-sectional area and an enhancement of the cooling performance of the field coil 8 in accordance with an increase in the axial length L1 of the stator iron core 32. It was found from FIG. 5 that the alternator power output per unit weight dropped at a great rate as the ratio L1/L2 was increased from a value of 1.0 (that is, the axial length L1 of the stator iron core 32 was increased). The drop in the alternator power output per unit weight was caused by the following factors. First, the cooling performance of the field coil 8 saturated (see FIG. 4). Second, an increase in the resistance of the armature coil 33 decreased the alternator power output per unit weight. A greater axial length L1 of the stator iron core 32 causes a greater alternator weight.

In view of the experimental results of FIGS. 4 and 5, the ratio L1/L2 is set in the range of 0.7 to 1.0.

Figure 11:
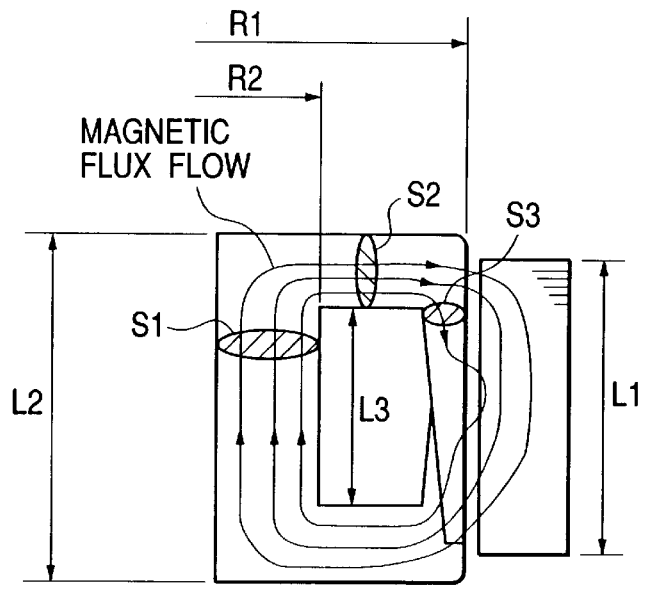
FIG. 11 is a diagram of magnetic flux flowing in the rotor and the stator in the alternator for the vehicle according to the embodiment of this invention.
Figure 12:
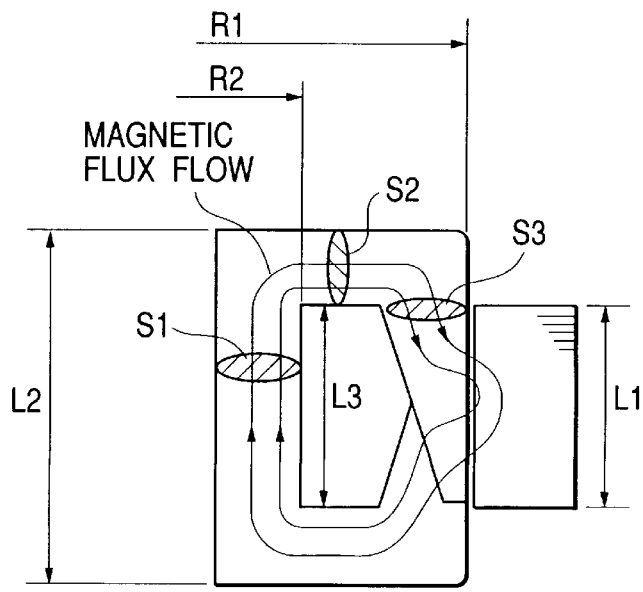
FIG. 12 is a diagram of magnetic flux flowing in a rotor and a stator in a prior-art alternator.
Figure 13:
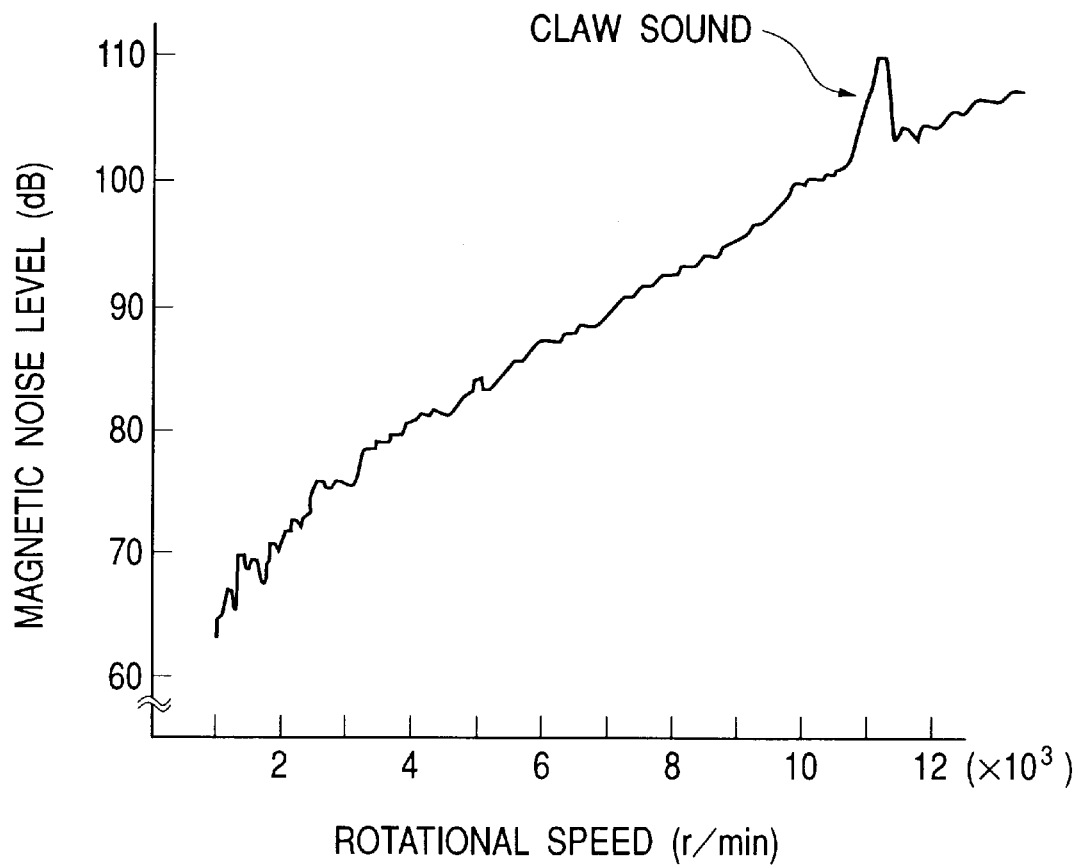
FIG. 13 is a diagram of the relation between the level of magnetic noise generated by a prior-art alternator and the rotational drive speed thereof.

As previously indicated, the ratio L1/L3 of the axial length L1 of the stator iron core 32 to the axial length L3 of the cylindrical portions 71 of the pole cores 7 is set in the range of 1.25 to 1.75. Therefore, as shown in FIG. 11, the yoke portions 72 of the pole cores 7 can be opposed to the stator iron core 32, and magnetic flux can directly flow from the yoke portions 72 into the stator iron core 32. Thus, the magnetic flux which comes from the claw-like magnetic pole portions 73 can be reduced, and the cross-sectional area of the claw-like magnetic pole portions 73 can be smaller than that in a prior-art structure. This is made clear from comparison between the magnetic flux flow of FIG. 12 in the prior-art structure and the magnetic flux flow of FIG. 11 in the first embodiment of this invention. Accordingly, the usable space in the pole cores 7 is provided with a surplus. Thus, while a suitable cross-sectional area of the field coil 8 is provided, the ratio R2/R1 of the outside radius R2 of the cylindrical portions 71 to the outside radius R1 of the claw-like magnetic pole portions 73 can be properly set with a magnetic-path cross-sectional area being greater than that in a prior-art structure. Specifically, the ratio R2/R1 of the outside radius R2 of the cylindrical portions 71 to the outside radius R1 of the claw-like magnetic pole portions 73 is set in the range of 0.54 to 0.60. Thus, it is possible to provide a magnetic-path cross-sectional area greater than that in a prior-art structure. Thus, the magnetic resistance can be reduced, and the magnetic flux generated by the rotor 3 can be increased. Since an increase in the volume of the pole cores 7 causes a rise in the thermal capacity, the temperature of the field coil 8 can be further lowered. Accordingly, the alternator of the first embodiment of this invention is highly efficient, and can generate a high power.

In the above-mentioned ranges of the dimensions and the ratios, since the volume of the claw-like magnetic pole portions 73 is reduced relative to that in a prior-art design, the weight thereof is also decreased. Thus, the natural frequency of the claw-like magnetic pole portions 73 rises, and an alternator rotational speed at which claw sound occurs is shifted toward a higher speed. During operation of the vehicle, the frequency of use of this high speed range is relatively small. Accordingly, the frequency of occurrence of claw sound can be reduced.

Figure 6:
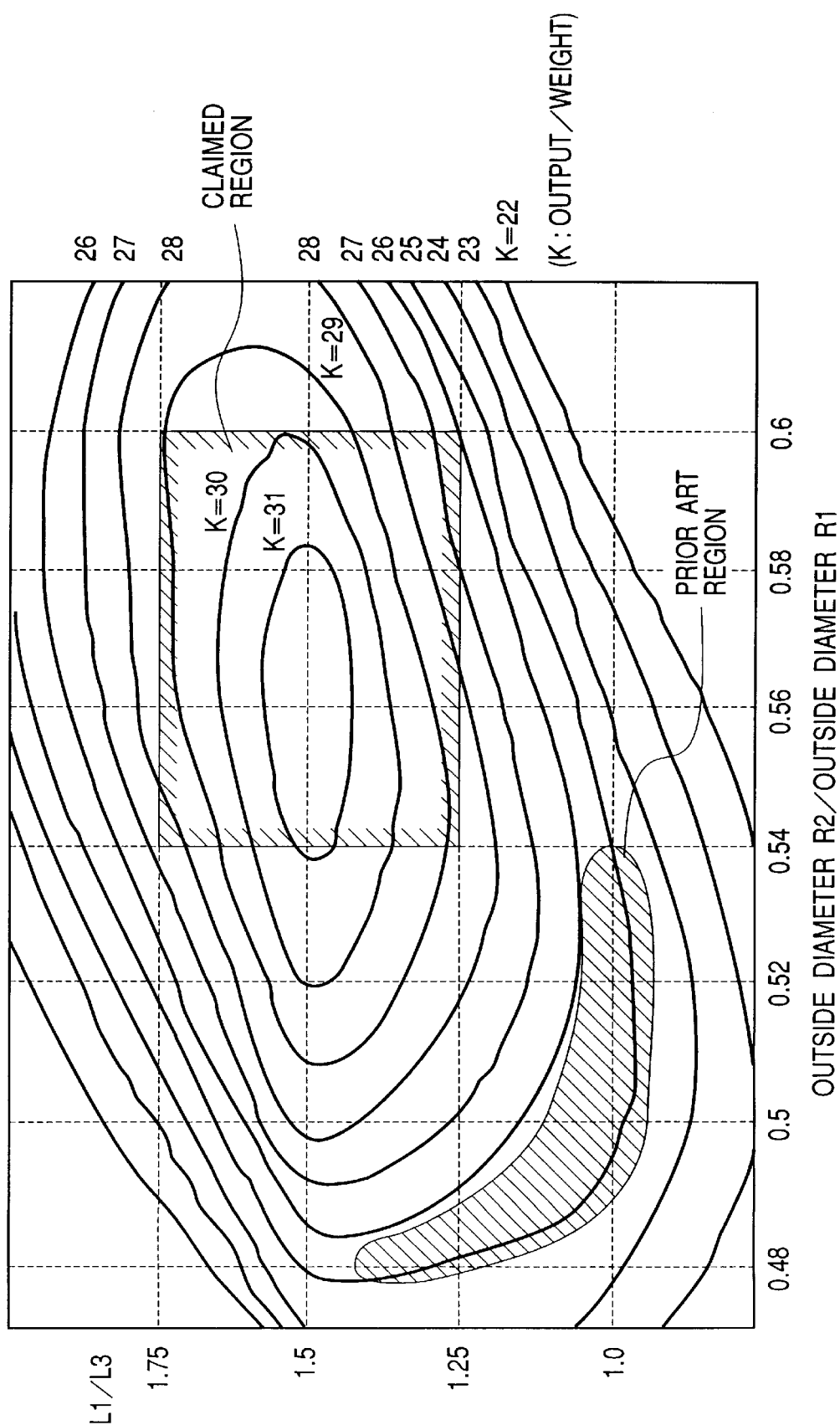
FIG. 6 is a diagram of the relation among an alternator power output per unit weight, a ratio L1/L3, and a ratio R2/R1.

The advantages of the first embodiment of this invention were confirmed by experiments. FIG. 6 shows the results of experiments during which the alternator power output per unit weight was measured while the ratios L1/L3 and R2/R1 were varied as parameters. As previously indicated, the value L1/L3 is equal to the ratio of the axial length L1 of the stator iron core 32 to the axial length L3 of the cylindrical portions 71 of the pole cores 7. The value R2/R1 is equal to the ratio of the outside radius R2 of the cylindrical portions 71 to the outside radius R1 of the claw-like magnetic pole portions 73.

In FIG. 6, the ordinate denotes the value L1/L3, that is, the ratio of the axial length L1 of the stator iron core 32 to the axial length L3 of the cylindrical portions 71 of the pole cores 7 while the abscissa denotes the value R2/R1, that is, the ratio of the outside radius R2 of the cylindrical portions 71 to the outside radius R1 of the claw-like magnetic pole portions 73. In FIG. 6, the alternator power output per unit weight is denoted by the contour lines. During the experiments, the ratio L1/L3 was used as a parameter and the radial-direction thickness X1 of the claw-like magnetic pole portions 73 was changed after the outside radius R2 of the cylindrical portions 71 was fixed, and the peaks of the alternator power output per unit weight were plotted.

Figure 7:
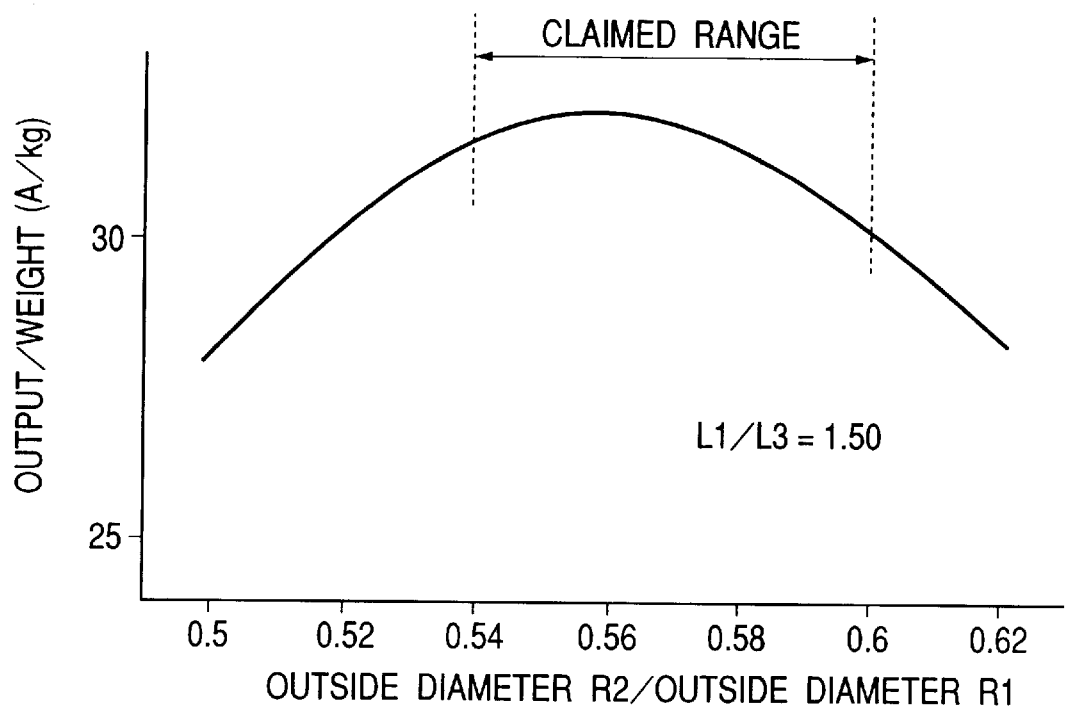
FIG. 7 is a diagram of the relation between an alternator power output per unit weight and a ratio R2/R1.

FIG. 7 shows conditions of a region near the maximal point in FIG. 6. Specifically, FIG. 7 indicates the alternator power output per unit weight which was available in the case where the ratio R2/R1 was varied while the ratio L1/L3 was fixed to 1.50.

Figure 8:
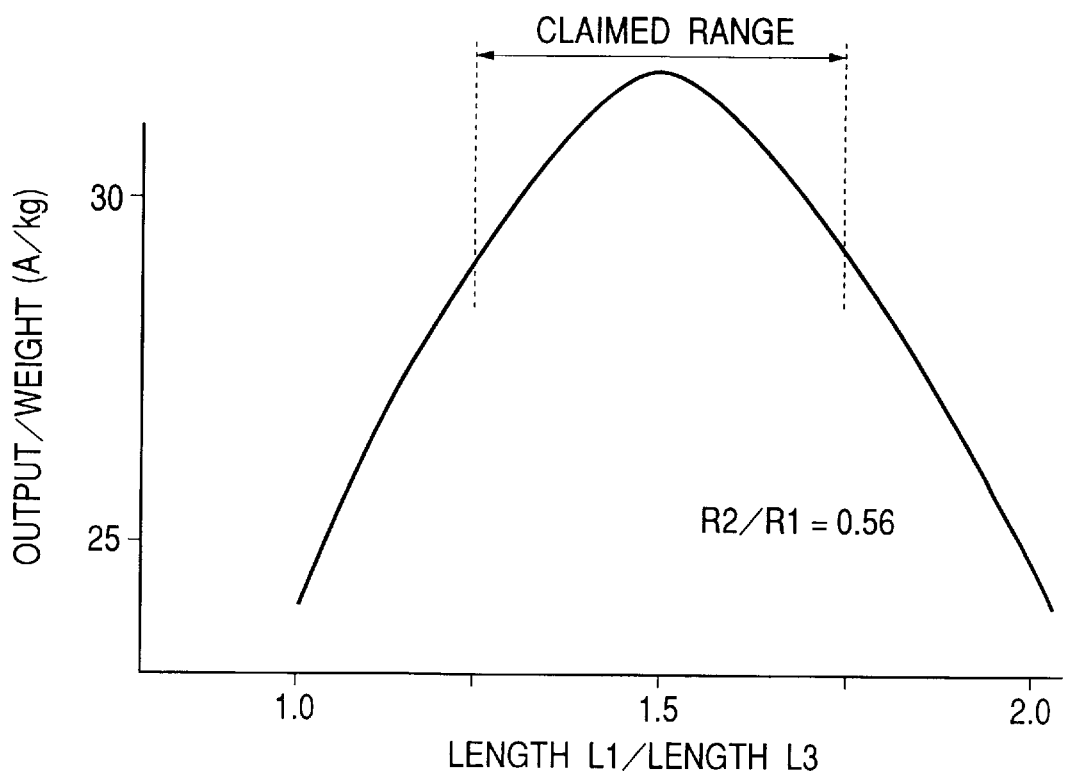
FIG. 8 is a diagram of the relation between an alternator power output per unit weight and a ratio L1/L3.

FIG. 8 shows conditions of a region near the maximal point in FIG. 6. Specifically, FIG. 8 indicates the alternator power output per unit weight which was available in the case where the ratio L1/L3 was varied while the ratio R2/R1 was fixed to 0.56.

In FIG. 6, a prior-art region extends near the line on which the ratio L1/L3 is equal to "1". As shown in FIG. 6, the alternator power output per unit weight rises in a region where both the ratios L1/L3 and R2/R1 are increased from those available in the prior-art region. Specifically, the alternator power output per unit weight is maximized when the ratio L1/L3 is equal to about 1.5 while the ratio R2/R1 is equal to about 0.56. The optimal range of the ratio R2/R1 shifts in accordance with a change of the ratio L1/L3 with respect to the prior-art region. In the case where the magnetic-path cross-sectional area is greater than that available in a prior-art structure, or in the case where the outside radius R2 of the cylindrical portions 71 is relatively great, the optimal point is available and the maximum alternator power output is further increased. On the other hand, the weight of the stator 2 excessively increases when the increase in the ratio L1/L3 exceeds a certain value. It is found that the alternator power output per unit weight is improved over that in a prior-art structure when the ratio L1/L3 is in the range of 1.25 to 1.75 and the ratio R2/R1 is in the range of 0.54 to 0.60.

It is shown in FIG. 6 that only a change in the ratio L1/L3 or only a change in the ratio R2/R1 hardly provides an beneficial effect, and that such a change tends to decrease the alternator power output. In the first embodiment of this invention, both the ratios L1/L3 and R2/R1 are suitably adjusted, and thereby a synergistic effect is provided which causes good alternator output characteristics unavailable in a prior-art structure.

In the first embodiment of this invention, since the field coil 8 has a mountain-like shape, the area occupied by the field coil 8 increases so that a higher alternator power output is available.

In the first embodiment of this invention, the field coil 8 is surrounded by the insulating paper 81 which uses the resin impregnated sheet. Thus, sufficient electric insulation between the claw-like magnetic pole portions 73 and the field coil 8 is provided, and the space in the pole cores 7 can be maximally used and the alternator power output can be further increased. It is unnecessary to use adhesive for fixing the field coil 8. This is advantageous for a simplified alternator structure and a low manufacturing cost.

During the fabrication of the rotor 3, portions of the field coil 8 are bonded together by using the resin impregnated sheet 81. At that time, inner circumferential surfaces of the claw-like magnetic pole portions 73 are bonded to the field coil 8. Thus, after the fabrication of the rotor 3 is completed, resonance of the claw-like magnetic pole portions 73 is suppressed and hence claw sound is prevented from occurring.

As shown in FIG. 10, the armature coil 33 is formed by a regular arrangement of the U-shaped electric conductors 331. The armature coil 33 has a pattern such that the electric conductors 331 which form the coil ends are spaced at regular intervals in the circumferential direction of the stator iron core 32.

In a prior-art structure, coil ends of an armature coil on a stator which have different phases partially overlap each other in radial directions, and the radial-direction thickness of the coil ends needs to be small to dispose the stator with the armature coil in an alternator housing. Accordingly, in the prior-art structure, it is usual that the axial-direction height of the coil ends is set great and hence the coil ends are made into a flat shape, and the radial-direction thickness thereof is set small. Thus, in the prior-art structure, it is necessary that the height of the coil ends is equal to or greater than a certain value. As a result, in the prior-art structure, the axial-direction length of the stator is increased as the axial length of the stator iron core is increased, and it is difficult to locate the stator without changing an axial-direction space in the alternator housing.

On the other hand, in the first embodiment of this invention, as shown in FIG. 10, the coil ends are equal in axial-direction thickness, and the height of the coil ends can be smaller than that in a prior-art structure. Accordingly, the axial length L1 of the stator iron core 32 can be greater than that in a prior-art structure while the housing 4 of the alternator 1 remains unchanged. Therefore, the parameters of the alternator 1 can be set in the previously-mentioned optimal ranges without limitation by the housing 4 of the alternator 1. As a result, it is possible to provide a compact alternator structure and a high alternator power output.

Other Embodiments

In the first embodiment of this invention, the ratio L1/L2 of the axial length L1 of the stator iron core 32 to the axial length L2 of the pole cores 7 is set in the range of 0.7 to 1.0. As shown in FIG. 5, to provide a stable and high alternator power output per unit weight, it is more preferable that the ratio L1/L2 is in the range of 0.75 to 0.85.

In the first embodiment of this invention, the ratio L1/L3 of the axial length L1 of the stator iron core 32 to the axial length L3 of the cylindrical portions 71 of the pole cores 7 is set in the range of 1.25 to 1.75. In addition, the ratio R2/R1 of the outside radius R2 of the cylindrical portions 71 to the outside radius R1 of the claw-like magnetic pole portions 73 is set in the range of 0.54 to 0.60. As shown in FIG. 6, to provide a stable and high alternator power output per unit weight, it is more preferable that the ratio L1/L3 is in the range of 1.43 to 1.60, and the ratio R2/R1 is in the range of 0.54 to 0.58.

In the first embodiment of this invention, the field coil 8 has a resistance of 2.3 Ω. Even in the case where the resistance of the field coil 8 differs from 2.3 Ω, the principle is the same and similar results are available while only the magnetomotive force changes.

A general range of the resistance of a field coil is decided by limitation on the cooling ability of an air cooled alternator for a vehicle. The general range extends between 1.2 Ω and 3.6 Ω for an alternator designed to operate at a voltage of 12 V. The general range extends between 4.8 Ω and 14.4 Ω for an alternator designed to operate at a voltage of 24 V.

The parameter setting ranges in the first embodiment of this invention are effective when the resistance of the field coil 8 is in the above-mentioned general range.

In the first embodiment of this invention, the outside radius R1 of the claw-like magnetic pole portions 73 is equal to 92 mm. Similar advantageous results are available even when the size of the claw-like magnetic pole portions 73 is changed. The parameter setting ranges in the first embodiment of this invention are effective when the outside radius R1 of the claw-like magnetic pole portions 73 is set in the range of 70 mm to 110 mm.

In the first embodiment of this invention, the number of magnetic poles in the rotor 3 is twelve. Similar advantages are available even when the number of magnetic poles in the rotor 3 is equal to another value, for example, fourteen or sixteen.

In the first embodiment of this invention, the rotor 3 uses the two pole cores 7 each having an integral body of the cylindrical portion 71, the yoke portion 72, and the claw-like magnetic pole portion 73. Alternatively, the rotor 3 may use a combination of three members, that is, a first member being a cylindrical portion and second and third members each being an integral body of a yoke portion and a claw-like magnetic pole portion.

What is claimed is:

1. An alternator for a vehicle, comprising:

a field rotor including a Lundel-type iron core and a field coil provided on the Lundel-type iron core, the Lundel-type iron core having a cylindrical portion, a yoke portion, and a claw-like magnetic pole portion being connected to the yoke portion and being formed so as to surround the field coil; and a stator located radially outward of the claw-like magnetic pole portion and opposed to the claw-like magnetic pole portion, the stator including a multiple-layer iron core;

wherein a ratio $L1/L2$ of an axial direction length $L2$ of the multiple-layer iron core of the stator to an axial-direction length $L2$ of the Lundel-type iron core is in a range of 0.7 to 1.0, said Lundel-type iron core has said axial-direction length $L2$ at an inner circumference of said cylindrical portion of said Lundel-type iron core, and said Lundel-type iron core extends radially outward from said inner circumference of said cylindrical portion without ever having an axial-direction length greater than said length $L2$, and a ratio $L1/L3$ of the axial-direction length $L1$ of the multiple-layer iron core of the stator to an axial-direction length $L3$ of the cylindrical portion of the Lundel-type iron core is in a range of 1.25 to 1.75, and a ratio $R2/R1$ of an outside radius $R2$ of the cylindrical portion of the Lundel-type iron core to an outside radius $R1$ of the claw-like magnetic pole portion of the Lundel-type iron core is in a range of 0.54 to 0.60.

2. An alternator according to claim 1, further comprising a resin impregnated sheet surrounding the field coil, the field coil being in engagement with an inner circumferential surface of the claw-like magnetic pole portion via the resin impregnated sheet.

* * * * *